UNITED STATES PATENT OFFICE 2,473,885

MONOAZO DYESTUFFS

Basil Jason Heywood, Blackley, Manchester, England, assignor to Imperial Chemical Industries Limited, a corporation of Great Britain No Drawing. Application August 3, 1945, Serial No. 608,843. In Great Britain August 28, 1944

6 Claims. (Cl. 260—205)

This invention relates to the manufacture of new monoazo dyestuffs, and more particularly to such dyestuffs as are eminently suitable for dyeing cellulose acetate artificial silk and nylon.

According to the present invention new monoazo dyestuffs are manufactured by a process comprising coupling a diazotised p-nitroaniline which may carry substituents other than sulphonic acid, carboxylic acid or cyano groups, with the sulphuric ester of an N-hydroxyalkyl-N-phenoxy- or naphthoxy-alkyl (2, 3, 4 or 5 carbon atoms)-aniline which may carry further substituents other than sulphonic acid or carboxyl substituents subject to its being capable of coupling in the para position to the nitrogen atom.

According to a further feature of this invention the same monoazo dyestuffs are made by using as coupling component the N-hydroxyalkyl-N-phenoxy- or naphthoxy-alkyl (2, 3, 4 or 5 carbon atoms)-aniline in place of its sulphuric ester, and subsequently converting the resulting hydroxyalkyl monoazo compound to its sulphuric ester by treatment with sulphuric acid or other known agent suited to yield its sulphuric ester.

Examples of nitroarylamines are:

p-Nitraniline
2-chloro-4-nitraniline
2-bromo-4-nitraniline
2:6-dichloro-4-nitraniline
2-chloro-6-bromo-4-nitraniline
2:6-dibromo-4-nitraniline
2:4-dinitraniline
6-chloro-2:4-dinitraniline
6-bromo-2:4-dinitroaniline
5-nitro-2-aminoanisole
5-nitro-2-aminotoluene By way of an N-hydroxyalkyl-N-aryloxy-alkyl (2, 3, 4 or 5 carbon atoms)-aniline there may be employed, e. g.:

N-β-hydroxyethyl-N-β'-phenoxyethylaniline
N-β-hydroxyethyl-N-β'-p-tolyloxyethylaniline
N-β-hydroxyethyl-N- β'- p - chlorophenoxyethylaniline
N-β-hydroxyethyl - N - β'-(α'')- naphthoxyethylaniline
N-β-hydroxyethyl-N-β'- phenoxyethyl-m-aminotoluene
N-β-hydroxyethyl-N-β'-phenoxyethyl-cresidine
N-β-hydroxyethyl-N- β'- phenoxyethyl-m-chloraniline
N-β-hydroxyethyl-N-β'- phenoxyethyl-m-aminoanisole
N-β-hydroxyethyl-N-β'- phenoxyethyl-m-acetylaminoaniline
N-β-hydroxyethyl-N-γ'-phenoxypropylaniline
N-β-hydroxy-n-propyl-N-β'-phenoxyethylaniline
N-ω-hydroxy-n-amyl-N-β'-phenoxyethylaniline
N-β-hydroxyethyl-N-ω-phenoxy-n-amylaniline The new dyestuffs in the form of their alkali metal or ammonium salts, are soluble in water and have very good affinity for cellulose acetate artificial silk which they dye from a neutral, slightly acid or slightly alkaline dyebath in orange, red, crimson, violet, blue and brown shades. The resulting shades possess good fastness properties, are dischargeable and are suitable for printing cellulose acetate artificial silk. The new dyestuffs are, moreover, generally suitable for application to cellulose acetate artificial silk from dilute or "long liquors" such as are employed in dyeing with the winch.

The new dyestuffs are also valuable for the dyeing of wool, natural silk, tin weighted silk, leather and nylon.

The new dyestuffs are advantageously applied to the colouring of synthetic fibres, for example, cellulose acetate artificial silk and nylon, which application constitutes a still further feature of this invention.

The invention is illustrated, but not limited, by the following examples in which parts are given by weight.

Example 1

A fine suspension of 13.8 parts of p-nitroaniline in 400 parts of water and 36 parts of 36% hydrochloric acid is diazotised by the addition of 6.9 parts of sodium nitrite dissolved in 50 parts of water. The filtered solution of the diazo compound, cooled to 5° C., is slowly added to a similarly cooled and stirred solution of 35.9 parts of the sodium salt of N-β-hydroxyethyl-N-β'-phenoxyethylaniline sulphuric ester in 400 parts of water. After stirring for one hour, the coupling is completed by the addition of sufficient 50% aqueous sodium acetate to remove the mineral acidity from the coupling medium. When coupling is complete, the suspension of the monoazo dyestuff is then rendered just alkaline to brilliant yellow by the addition of 5N sodium hydroxide solution. The dyestuff is filtered off, washed with 2½% aqueous sodium chloride and dried at 30–40° C.

The new dyestuff forms a dark red powder which dissolves in water with a scarlet colouration and in concentrated sulphuric acid with a reddish brown colour. It dyes cellulose acetate artificial silk in scarlet shades when applied from a neutral dyebath containing Glauber's salt or sodium chloride, the dyeings exhibiting good fastness to wet treatments and to light, good dischargeability and freedom from sublimation. It is also suitable for the printing of acetate artificial silk.

The dyestuff in its acid form is represented by the following formula:

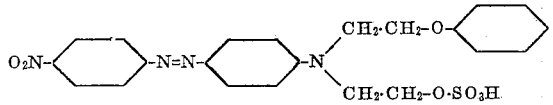

N-β-hydroxyethyl - N - β'-phenoxyethylaniline sulphuric ester is obtainable by causing N-β-phenoxyethylaniline to react with ethylene chlorhydrin in boiling aqueous suspension in the presence of chalk, to give N-β-hydroxyethyl-N-β'-phenoxyethylaniline which is converted to its sulphuric ester by treatment with chlorosulphonic acid in tetrachloroethane solution. N-β-phenoxyethylaniline is obtained by heating aniline with β-phenoxyethyl bromide.

Example 2

A fine suspension of 17.3 parts of o-chloro-p-nitroaniline in 300 parts of water and 30 parts of 36% hydrochloric acid is diazotised by the addition of 6.9 parts of sodium nitrite dissolved in 50 parts of water. The filtered solution of the diazonium compound, cooled to 5° C., is slowly added to a similarly cooled and stirred solution of 35.9 parts of the sodium salt of N-β-hydroxyethyl - N - β' - phenoxyethylaniline sulphuric ester in 400 parts of water. After stirring the mixture for one hour 50% aqueous sodium acetate is added gradually to remove the mineral acidity of the coupling medium. When coupling is complete the dyestuff is isolated and dried in the same manner as described in Example 1.

The new dyestuff forms a dark red powder which dissolves in water to a red solution and in concentrated sulphuric acid to a reddish brown solution. It dyes cellulose acetate artificial silk from a neutral or slightly alkaline dyebath containing Glauber's salt or sodium chloride in crimson shades, the dyeings exhibiting good fastness to wet treatments and to light, good dischargeability and freedom from sublimation.

The dyestuff in its acid form is represented by the following formula:

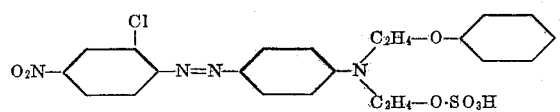

Example 3

A fine suspension of 13.8 parts of p-nitroaniline in 400 parts of water and 36 parts of 36% hydrochloric acid is diazotised by the addition of 6.9 parts of sodium nitrite dissolved in 50 parts of water. The filtered solution of the diazo compound, cooled to 5° C., is slowly added to a similarly cooled and stirred solution of 37.3 parts of the sodium salt of N-β-hydroxyethyl-N-γ'-phenoxypropylaniline sulphuric ester dissolved in 400 parts of water. After stirring the coupling mixture for 2 hours sufficient 50% aqueous sodium acetate is added to remove the mineral acidity of the coupling medium. Stirring is continued until coupling is complete. The suspension of the monoazo dyestuff is then rendered alkaline to brilliant yellow by the addition of 5N sodium hydroxide solution. The dyestuff is filtered off, washed with 2½% aqueous sodium chloride and dried at 30°–40° C.

The new dyestuff forms a dark red powder which dissolves in water to a red solution and in concentrated sulphuric acid to a brown solution. It dyes cellulose acetate artificial silk and nylon from a neutral or slightly alkaline dyebath containing Glauber's salt or sodium chloride in crimson shades, the dyeings having good fastness to wet treatments and to light. It is also well suited for printing cellulose acetate artificial silk.

The dyestuff in its acid form is represented by the following formula:

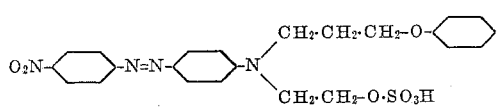

Example 4

In Example 2 37.3 parts of the sodium salt of N-β-hydroxyethyl-N-γ'-phenoxypropylaniline are used in the place of 35.9 parts of the sodium salt of N-β-hydroxyethyl-N-β'-phenoxyethylaniline sulphuric ester.

The new dyestuff forms a dark powder which dissolves in water to a crimson solution and in concentrated sulphuric acid to a brown solution. It dyes cellulose acetate artificial silk in red shades from a neutral or slightly alkaline dyebath containing Glauber's salt or sodium chloride, the dyeings having good fastness to wet treatments and to light.

The dyestuff in its acid form is represented by the following formula:

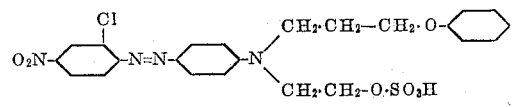

Example 5

20.7 parts of 2:6-dichloro-4-nitroaniline are diazotised by gradual addition to a solution of 6.9 parts of sodium nitrite in 148 parts of concentrated sulphuric acid. The sulphuric acid solution is stirred for 1 hour and then added to a stirred mixture of 400 parts of ice and 100 parts of water. The filtered solution of the diazo compound so obtained is added gradually to an ice cold stirred solution of 39.4 parts of the sodium salt of N-β-hydroxyethyl-N-β'-p-chlorophenoxyethylaniline sulphuric ester in 400 parts of water. Simultaneously with the addition of the diazo solution, 40% aqueous sodium hydroxide solution is added at such a rate as to keep the coupling faintly acid to Congo red paper. The temperature of the coupling mixture is kept throughout at 0–5° C. by the addition of ice as necessary. When all the diazo solution has been added, the coupling medium is made alkaline to litmus by the addition of aqueous sodium hydroxide solution. The dyestuff, in the form of its sodium salt, is filtered off and dried at 30–40° C.

The new dyestuff is a dark brown powder which dissolves in hot water to give a reddish orange solution and in sulphuric acid to give a dull orange solution. It dyes cellulose acetate artificial silk and nylon in orange brown shades when applied from a neutral dyebath containing Glauber's salt or sodium chloride; the dyeings exhibit good fastness to wet treatments and to light. The new dyestuff is very well suited to the printing of cellulose acetate artificial silk.

The dyestuff in its acid form is represented by the following formula:

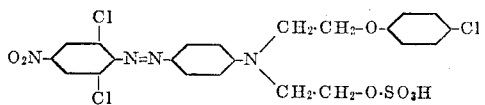

Example 6

19 parts of 2:4-dinitroaniline are diazotised by gradual addition to a solution of 6.9 parts of sodium nitrite in 150 parts of concentrated sulphuric acid. The sulphuric acid solution is stirred for two hours and then poured into a stirred mixture of 400 parts of ice and 100 parts of water. The filtered solution of the diazo compound is added gradually to a stirred and cooled solution of 37.3 parts of the sodium salt of N-β-hydroxyethyl - N - β' - phenoxyethyl-m-aminotoluene sulphuric ester in 400 parts of water. Simultaneously with the addition of the diazo solution, 40% aqueous sodium hydroxide solution is added at such a rate as to keep the coupling medium just acid to Congo red paper, the temperature being maintained at 0 to —5° C. throughout the coupling operation by additions of ice as necessary. When all the diazo solution has been added, the coupling is made just alkaline to litmus by the addition of 40% aqueous sodium hydroxide. The new dyestuff so-obtained is then filtered off and dried at 30–40° C.

It forms a black powder which dissolves in water to give a violet solution and in concentrated sulphuric acid to give a crimson solution. It dyes cellulose acetate artificial silk in reddish violet shades when applied from a neutral or alkaline dyebath containing Glauber's salt or sodium chloride; the dyeings exhibit good fastness to wet treatments and to light.

The dyestuff in its acid form is represented by the following formula:

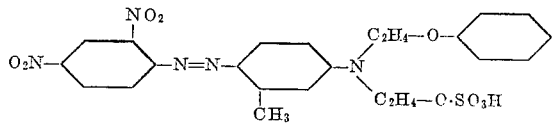

Example 7

21.8 parts of 6-chloro-2:4-dinitroaniline are gradually added to a solution of 6.9 parts of sodium nitrite in 130 parts of concentrated sulphuric acid. The resulting solution is warmed to 50–55° C. and kept at that temperature for 2 hours. It is then cooled to 30° C. and added slowly to a cooled and stirred solution of 37.3 parts of the sodium salt of N-β-hydroxyethyl-N-β'-phenoxyethyl - m - aminotoluene sulphuric ester in 400 parts of water. Simultaneously with the addition of the aqueous sulphuric acid solution of the diazo compound, 40% aqueous sodium hydroxide solution is added at such a rate that the coupling medium remains faintly acid to Congo red paper. The temperature of the coupling medium is maintained at 0° C. or below by additions of ice as necessary. When all the diazo solution has been added, sufficient 40% aqueous sodium hydroxide is added to render the coupling medium alkaline to litmus. The resulting suspension is stirred for 2 hours, and then the new dyestuff is filtered off and dried at 30–40° C.

The new dyestuff is a dark green powder which dissolves in water to give a bluish violet solution and in sulphuric acid to give a red solution. It dyes cellulose acetate artificial silk in bluish violet shades when applied from a neutral dyebath containing Glauber's salt or sodium chloride, and the dyeings exhibit good fastness to wet treatments and to light.

The dyestuff in its acid form is represented by the following formula:

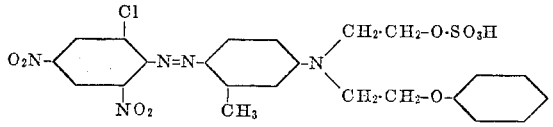

Example 8

A fine suspension of 13.8 parts of p-nitroaniline in 400 parts of water and 36 parts of 36% hydrochloric acid is diazotised by the addition of a solution of 6.9 parts of sodium nitrite in 50 parts of water. The filtered solution of the diazo compound, cooled to 5° C., is slowly added to a similarly cooled and stirred solution of 39.4 parts of the sodium salt of N-β-hydroxyethyl-N-β'-phenoxyethyl-m-chloroaniline sulphuric ester in 400 parts of water. The mixture is stirred for one hour, and then sufficient 50% aqueous sodium acetate solution is added to remove the mineral acidity of the coupling medium. The suspension of the monoazo dyestuff so-obtained is then rendered just alkaline to Brilliant Yellow paper by the addition of 40% aqueous sodium hydroxide. The dyestuff is filtered off, washed with 2.5% aqueous sodium chloride and dried at 30–40° C.

The new dyestuff forms a dark brown powder which dissolves in water to give a red solution and in concentrated sulphuric acid to give a reddish brown solution. It dyes cellulose acetate artificial silk and nylon in bright reddish orange shades, when applied from a neutral dyebath containing Glauber's salt or sodium chloride and the dyeings exhibit good fastness to wet treatments and to light, good dischargeability and freedom from sublimation. It is also suitable for the printing of cellulose acetate artificial silk. The new dyestuff is very well suited for the dyeing of cellulose acetate artificial silk from dilute or "long liquor" dyebaths such as one employed in the dyeing with the winch.

The dyestuff in its acid form is represented by the following formula:

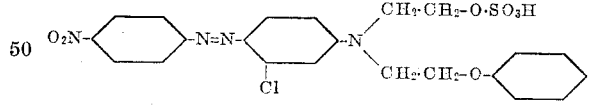

Example 9

13.8 parts of p-nitroaniline are diazotised as described in Example 1. The filtered solution of the diazo compound, cooled to 5–10° C. is then gradually added to a cooled and stirred solution of 25.7 parts of N-β-hydroxyethyl N-β-phenoxyethylaniline dissolved in 400 parts of water containing 12 parts of 36% hydrochloric acid. The mixture is stirred for one hour then sufficient 50% aqueous sodium acetate solution to neutralize the mineral acidity of the coupling medium is gradually added. The suspension of the monoazo compound is then rendered just alkaline to brilliant yellow by the addition of 40% aqueous sodium hydroxide solution. The monoazo compound is filtered off and dried at 30–40° C.

The powdered water-insoluble monoazo compound so obtained is converted into its sulphuric ester by adding it gradually to 150 parts of 70–80% sulphuric acid. The resulting mixture is stirred for 18 hours and then poured onto a stirred mixture of 400 parts of ice and 100 parts of water. The mixture is stirred for 1 hour then the sulphated dyestuff is filtered off and washed with water. It is then re-suspended in 400 parts of water and sufficient aqueous sodium hydroxide solution added to make the suspension just alkaline to brilliant yellow. The dyestuff, in the form of its sodium salt, is filtered off and dried at 30–40° C.

The new dyestuff forms a dark red powder which dissolves in water to give a scarlet solution and in concentrated sulphuric acid to give a reddish brown solution. It possesses dyeing properties similar to those of the dyestuff described in Example 1 and is believed to be identical with that dyestuff.

Other dyestuffs, which further illustrate the invention, and which may be prepared by methods similar to those described in the fore-going examples are listed in the following table:

| Example No. | Diazo Component | Coupling Component | Shade on cellulose acetate artificial silk |
|---|---|---|---|
| 10 | p-Nitroaniline | N-β-hydroxyethyl-N-β'-p-tolyloxyethylaniline sulphuric ester | scarlet. |
| 11 | 2:6-Dichloro-4-nitroaniline | ---do--- | orange brown. |
| 12 | p-Nitroaniline | N-β-hydroxyethyl-N-β'-p-chlorophenoxyethylanilic sulphuric ester | reddish orange. |
| 13 | ---do--- | N-β-hydroxy-n-propyl N-β'-phenoxyethylaniline sulphuric ester | scarlet. |
| 14 | ---do--- | N-β-hydroxyethyl-N-β'-phenoxyethyl-m-amino-anisole sulphuric ester | Do. |
| 15 | ---do--- | N-β-hydroxyethyl-N-β'-phenoxyethyl-m-amino-toluene sulphuric ester | Do. |
| 16 | o-Chloro-4-nitraniline | ---do--- | crimson. |
| 17 | 2:6-Dichloro-4-nitroaniline | ---do--- | orange brown. |
| 18 | o-Chloro-4-nitroaniline | N-β-hydroxyethyl-N-β'-phenoxyethyl-m-chloroaniline sulphuric ester | red. |
| 19 | o-Bromo-4-nitroaniline | ---do--- | Do. |
| 20 | p-Nitroaniline | N-β-hydroxyethyl-N-β'-(α'') naphthoxyethylaniline sulphuric ester | scarlet. |
| 21 | 6-Bromo-2:4-dinitroaniline | N-β-hydroxyethyl-N-β'-phenoxyethyl-cresidine sulphuric ester | reddish-blue. |

The coupling components of Examples 11–18 and 21 may be obtained by reacting the appropriate hydroxyalkylated arylamine with the appropriate aryloxyalkyl chloride or bromide in boiling aqueous medium in the presence of a suitable acid-binding agent (for example chalk). ω-Phenoxy-n-amyl bromide is obtained by reacting sodium phenate with ω-chloroamyl acetate to give ω-phenoxy-n-amyl acetate which is hydrolysed to ω-phenoxy-n-amyl alcohol by boiling with aqueous hydrochloric acid and finally converted into the bromide by treatment with hydrobromic acid. N-β-hydroxy-n-propyl N-β-phenoxyethylaniline is obtained by heating N-β-phenoxyethylaniline with propylene oxide to 160° C. under pressure. N-ω-hydroxy-n-amyl-N-β-phenoxyethylaniline is obtained by reacting N-omega-acetoxy-n-amylaniline with beta-phenoxyethyl bromide to yield N-ω-acetoxy-n-amyl-N-β-phenoxyethylaniline which is boiled with 20% aqueous hydrochloric acid to give the desired product. N-ω-acetoxy-n-amylaniline can be prepared by reacting ω-chloro-n-amyl acetate with an excess of aniline at 110° C.

I claim:

1. A monazo dyestuff being the diazo of a para nitro aniline which is devoid of sulfonic acid, carboxylic acid and cyano groups coupled with the sulfuric acid ester of an N-hydroxyalkyl-N-aryloxy-alkyl-aniline in which alkyl of both the hydroxyalkyl and the aryloxyalkyl groups has 2 to 5 carbons and aryloxy of the aryloxy-alkyl group is from the group consisting of phenoxy, tolyloxy, chlorophenoxy and naphthoxy, said coupling component being devoid of sulfonic acid and carboxylic acid groups; said coupling being para to the nitrogen atom.

2. A monazo dyestuff in accordance with claim 1 in which the aryloxy-alkyl group is ethyl phenoxy.

3. A monazo destuff represented by the formula

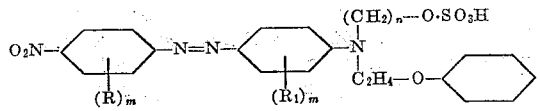

in which n is 2 to 5; R is from the group consisting of hydrogen, chloro, bromo and nitro; R₁ is from the group consisting of hydrogen, methyl, methoxy, chloro, bromo and acetylamino; and m is an integer not greater than 2.

4. The monazo dyestuff represented by the formula

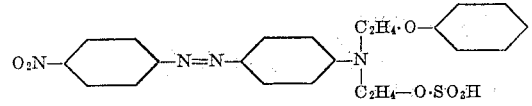

5. The monazo dyestuff represented by the formula

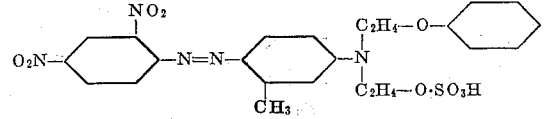

6. The monazo dyestuff represented by the formula

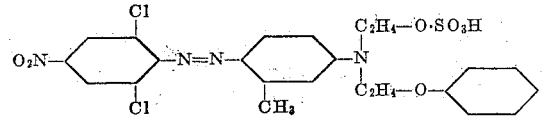

BASIL JASON HEYWOOD.

REFERENCES CITED

The following references are of record in the file of this patent:

UNITED STATES PATENTS

| Number | Name | Date |
|---|---|---|
| 2,045,323 | Felix | June 23, 1936 |
| 2,069,836 | Knight | Feb. 9, 1937 |
| 2,088,327 | Knight | July 27, 1937 |

FOREIGN PATENTS

| Number | Country | Date |
|---|---|---|
| 441,884 | Great Britain | Jan. 27, 1936 |